United States Patent [19]

Irven et al.

[11] 4,165,224

[45] Aug. 21, 1979

[54] METHOD OF MANUFACTURING OPTICAL FIBRE PREFORMS

[75] Inventors: John Irven, Harlow; Andrew P. Harrison, Stansted, both of England

[73] Assignee: International Standard Electric Corporation, New York, N.Y.

[21] Appl. No.: 888,050

[22] Filed: Mar. 17, 1978

[30] Foreign Application Priority Data

Mar. 24, 1977 [GB] United Kingdom ............... 12431/77

[51] Int. Cl.² ........................ C03B 37/02; C03C 25/02
[52] U.S. Cl. ......................................... 65/3 A; 65/110; 65/DIG. 7; 65/DIG. 16
[58] Field of Search .......... 65/3 A, 109, 110, DIG. 7, 65/DIG. 16

[56] References Cited

FOREIGN PATENT DOCUMENTS 2434717 3/1975 Fed. Rep. of Germany ............ 65/3 A

OTHER PUBLICATIONS

"Preparation of Low Loss Optical Fibers Using Simultaneous Vapor Phase Deposition and Fusion" by MacChesney et al., pp. 6—40 to 6—45 of 10th International Congress on Glass, 1974, Bell Laboratories, Murray Hill, N.J., 07974, USA.

*Primary Examiner*—Arthur D. Kellogg
*Attorney, Agent, or Firm*—John T. O'Halloran; Peter C. Van Der Sluys; Stephen B. Goldman

[57] ABSTRACT

In the manufacture of silica optical fibers a tube having an internal coating of a volatile dopant is locally heated by a hot zone repeatedly traversed along its length to promote shrinkage and finally collapse of the tube bore. During the shrinkage prior to the final collapse traversal a gas flow of oxygen and a halide of the volatile dopant is maintained through the tube in order firstly to provide a small overpressure to ensure circularity in the shrinkage and secondly to compensate for the tendency for dopant to be lost by volatilization.

9 Claims, 4 Drawing Figures

METHOD OF MANUFACTURING OPTICAL FIBRE PREFORMS

BACKGROUND OF THE INVENTION

1. Field of the Invention

This invention relates to the manufacture of silica optical fiber preforms.

2. Description of the Prior Art

In the method of optical fiber preform manufacture to which this invention relates, the silica tube, complete with the coating lining its bore, is heated to cause the tube to soften and its bore collapse by the effect of the forces of surface tension. For this purpose a source of heat, such as an oxyhydrogen flame, provides a localized hot zone which is slowly traversed along the tube to effect localized softening of the tube wall. Collapse is performed by a number of passes of the hot zone, whereby the bore of the tube is progressively reduced in diameter until on a final pass the bore is completely collapsed, thereby creating a solid optical fiber preform from which optical fiber may subsequently be formed by a drawing down operation.

With this method of manufacture there is the general problem that as the tube softens, and its bore begins to collapse, the surface tension forces tend to seek the minimum energy configuration. This unfortunately is not one of circular symmetry, but rather is one in which the tube bore is flattened out.

A second problem occurs if the core material contains a volatile dopant such as germania and/or phosphorus pentoxide, and concerns simply the fact that the high temperatures necessary to soften the tube wall may also be sufficient to cause appreciable volatilization and loss of the volatile dopant from the bore surface, thereby modifying the refractive index profile of the resulting preform.

To obtain a small pulse dispersion in a fiber it is necessary to grade the refractive index profile across the core region to a near-parabolic shape. The concentration of refractive index enhancing dpoant should be low at the core periphery, and should increase in a graded manner to reach a maximum at the center. Anything which causes a deviation from the ideal profile is detrimental to bandwidth capability. Taking by way of example the case where germania is used as a refractive index enhancing dopant, it is found that at the temperatures necessary to soften the silica tube for collapse (2000°-2200° C.) germania starts to be lost by volatilization via the sub-oxide according to the reaction:

$$GeO_2 \rightleftharpoons GeO + \tfrac{1}{2}O^2$$

If the deposited layer lining the bore of the tube is provided with a refractive index grading that, in the absence of volatilization effects, would produce the optimum grading in the preform, then the effect of volatilization is to produce a lowering of the refractive index at the center of the preform core as depicted in FIG. 1a. A further effect of volatilization is to produce a longitudinal variation in refractive index profile. Germania is lost from the tube wall at the hot zone via the sub-oxide, but, since this is a reversible reaction, some of this oxide recondenses on cooler regions of the bore ahead of the moving hot zone. Some of this condensate is re-incorporated by diffusion into the glass as the hot zone advances, and this can give rise to the formation of a central peak within the trough in the refractive index at the center of the core of the preform. This peak is highest at the end longest exposed to the recondensation of the dopant, and can, at this end, produce a refractive index profile as depicted in FIG. 1b.

SUMMARY OF THE INVENTION

According to the present invention there is provided a method of silica optical fiber preform manufacture wherein the material that is to form the core of the preform contains a volatile oxide and is provided as a layer of doped silica lining the bore of a silica tube, wherein the bore of the tube complete with its lining is first shrunk and then finally collapsed by repeatedly traversing a hot zone along the tube while it is rotated about its axis, and wherein during said shrinking of the bore a slight overpressure is maintained in the bore by a gas mixture containing oxygen and a halide or oxyhalide of the element having said volatile oxide, passing said mixture halides of the volatile oxide through the tube, then through a reservoir, and finally through an unconstricted long pipe whose rheological conductance is small enough to provide the requisite overpressure within the tube to overcome the tendency for the tube to flatten during the shrinkage of its bore, and wherein the concentration of the halide or oxyhalide in relation to the oxygen is such as to compensate at least in part the volatile oxide loss by volatilization during bore shrinkage.

The preferred method of providing the core material is by co-depositing silica with one or more dopants by a vapor phase reaction. An alternative method involves the use of a vapor phase reaction to deposit dopant material upon a silica surface and cause the deposit to diffuse into the silica. In both instances a vapor phase reaction from which hydrogen and hydrogen containing compounds are excluded is preferred.

The silica tube referred to may be made of a doped silica, and may itself be formed by a deposited layer lining the bore of a tubular substrate.

There follows a description of a preferred method of performing the present invention which description is prefaced by reference to the background of the invention and makes reference to the drawings.

DESCRIPTION OF THE INVENTION

Figure 1A:
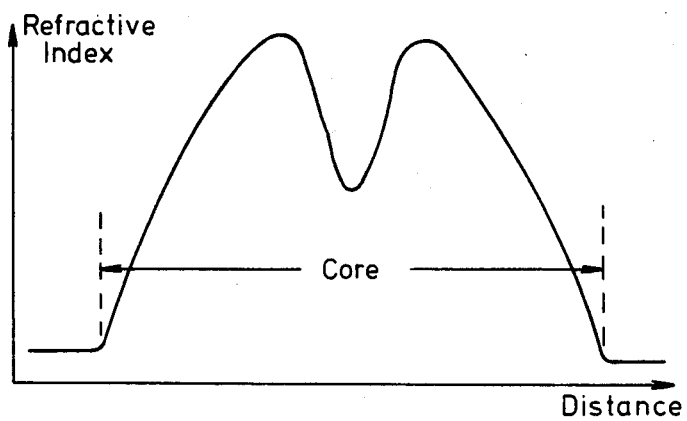
FIGS. 1a and 1b depict refractive index profiles at opposite ends of an optical fiber preform made using a volatile dopant.
Figure 1B:
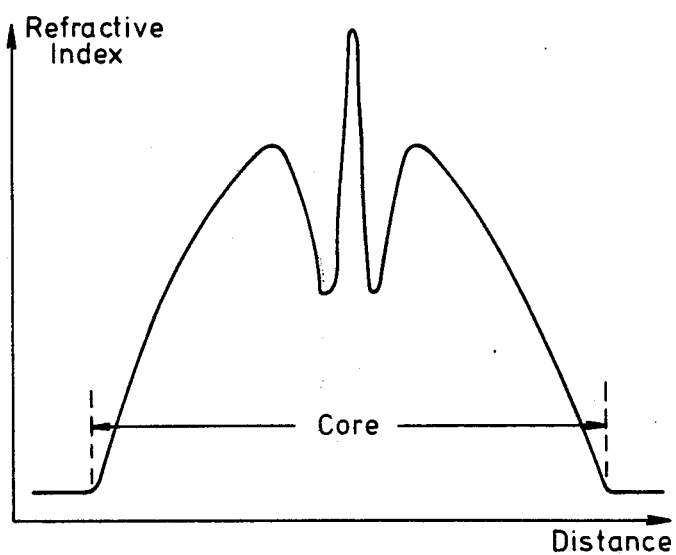

The present invention teaches how the loss by volatilization during the shrinking of the tube bore can be reduced or eliminated by passing a mixture of oxygen and a halide of the volatile dopant down the tube while its bore is being shrunk. A reversible reaction links the dopant halide and oxygen with the dopant oxide and the halogen. For phosphorus doping and for germania doping the oxychloride and chloride respectively may be used. Thus, in the case of the shrinking of the bore a silica tube internally lined with germania doped silica, germanium tetrachloride and oxygen are passed down the tube during the shrinking process. At the hot zone the chloride and oxygen react to produce germania and chlorine. The germania so formed tends to dissociate and form germanium monoxide (suboxide) (GeO) and oxygen. The excess germanium monoxide so formed tends to drive the equilibrium volatilization reaction into reverse thereby suppressing the loss of germania from the surface region of the bore of the tube.

$$GeCl_4 + O_2 \rightleftharpoons GeO_2 + 1Cl_2$$
<center>volatilization</center>

$$GeO_2 \rightleftharpoons GeO + \tfrac{1}{2} O_2$$
<center>equilibrium</center>

Clearly the flow of the halide and oxygen down the tube can only be maintained while the bore remains unsealed. During the final collapse of the bore the flow has to cease and hence there can be some loss by volatilization. However, by this stage the surface area of the bore has been significantly reduced by the previous shrinking of the bore diameter. This fact, coupled with the fact that this volatilization only occurs during the one traversal, is effective in significantly reducing the total loss as compared with that which occurs when there is no flow of halide and oxygen during the shrinking of the bore.

In order to produce the gas flow there has to be a pressure gradient, and according to the present invention the pressure gradient is provided in such a way that the pressure within the tube bore is slightly greater than the pressure outside. This overpressure is arranged to be the requisite value to counteract the aforementioned tendency of the tube bore to flatten while being shrunk, rather than to shrink symmetrically and preserve circular symmetry.

This tendency for the tube to flatten is greatest when the bore is relatively large and its wall thickness small. Thus, although some system may be arranged for producing a pressure differential during the final collapse traversal, this is by no means so important as during the initial stages of shrinking the tube bore.

In principal the requisite pressure differential could be provided by allowing the gases flowing down the tube to vent into the atmosphere via a regulating valve located immediately downstream of the tube. However, such an arrangement suffers from significant drawbacks. The flow of gas past the hot zone leads to a steady temperature increase inside the tube, and, since the volume trapped between the hot zone and the bleed valve remains substantially constant, this temperature rise is accomplished by an increase in pressure. This fact, coupled with the tendency of the regulating valve to become blocked with germanium oxide soot swept down from the hot zone, is liable to cause a catastrophic increase of internal pressure, which causes a local swelling of the tube until the wall finally becomes perforated.

This problem of temperature rise can be overcome by interposing a large reservoir between the tube and the regulating valve. With this arrangement a temperature rise in the tube has very little effect upon the pressure because the volume of the tube is small compared with that of the reservoir. The reservoir can also act as a trap for the soot, allowing the majority to settle out before the gas flow reaches the valve. However, residual quantities of soot are still eventually liable to block the valve. Accordingly a long length of tubing is substituted for the valve.

Figure 2:
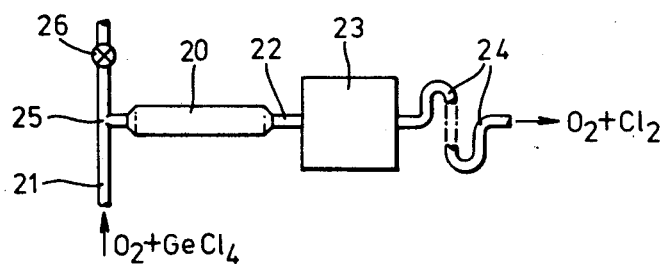
FIG. 2 is a schematic diagram of apparatus used in the manufacture of an optical fiber preform incorporated a volatile dopant.

Referring now to FIG. 2, in the preferred method of shrinking and collapsing the bore of a silica tube internally lined with a graded index layer of germania doped silica, the tube itself is depicted at 20. A mixture of oxygen and germanium tetrachloride vapor is fed into the tube 20 via a delivery pipe 21, and from the tube 20 via a further pipe 22 to a reservoir 23. Connected to outlet of the reservoir 23 is a long length of tubing 24. Optionally the delivery pipe 21 is provided with a tee 25, one limb of which terminates in a regulating valve 26.

The mixture of oxygen and germanium tetrachloride vapor is obtained by entraining the vapor in oxygen bubbled through germanium tetrachloride liquid maintained at a constant temperature. Typically it is maintained at ambient temperature, oxygen is bubbled through at 5cc per minute and then added to a stream of oxygen providing a total flow rate of 500 cc per minute. The tube is typically one meter long, has a wall thickness of 1mm and a bore diamter of 10 mm. The tube is continually rotated during the process of shrinking and final collapse of its bore. For this purpose the tube is mounted in a kind of lathe (not shown) which is equipped with a pair of chucks (not shown) which are synchronously driven. Rotary gas seals are required to connect the two pipes 21 and 22 with the ends of the tube, and these are conveniently provided by seals of the type described in the specification of United Kingdom Patent Application No. 10926/76. The dimensions of the seal between tube and pipe 22 are chosen such that possible blockage by germanium oxide soot swept down from the hot zone is minimized. The reservoir typically has a capacity of the order of 20 litres, and can be made of an inert plastic material such as polypropylene. Typically the requisite overpressure in the tube 20 is about 1 mm mercury, and this can be provided by using a length of up to about 50 meters of ⅜" bore inert (PVC) plastic tubing for the tubing 24.

In a typical process the bore is completely collapsed after three traverses of the hot zone (not shown). The first traverse takes the bore from 10 mm down to about 4 mm, and the second from about 4 mm down to about 1 mm. For the final traverse it is no longer possible to have a flow of gas down the tube 20, and hence the gas flow through the liquid germanium tetrachloride is shut off. If the apparatus is provided with the tee piece 25 and regulating valve 26 then this valve may be opened and a flow of oxygen maintained during the final traversal in order to provide the requisite overpressure. Under these circumstances the final traversal is from the further end of the tube 20 back up towards the end nearer the tee 25.

Figure 3:
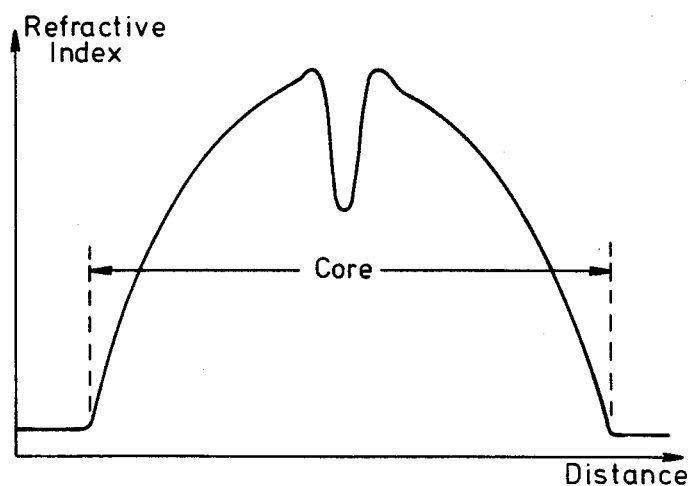
FIG. 3 depicts a refractive index profile of an optical fiber preform made using the apparatus of FIG. 2.

FIG. 3 depicts the refractive index profile. There is still a residual trough at the center, but its size and depth have been reduced, and furthermore, substantially the same profile extends all down the length of the preform.

After the bore has been completely collapsed the resulting preform is transferred to drawing apparatus for drawing down into optical fiber in conventional manner.

What is claimed is:

1. A method of silica optical fiber preform manufacture wherein the material that is to form the core of the preform contains a volatile oxide and is provided as a layer of doped silica lining the bore of a silica tube, wherein the bore of the tube complete with its lining is first shrunk and then finally collapsed by repeatedly traversing a hot zone along the tube while it is rotated about its axis, wherein during said shrinking of the bore a slight overpressure is maintained in the bore by a gas mixture containing oxygen and a halide or oxy-halide of the element having said volatile oxide, passing said mixture halides of the volatile oxide through the tube, then through a reservoir, of a size sufficient to trap soot swept down from the hot zone and to overcome the problem of heat rise within the tube, by acting as a heat sink and finally through an unconstricted long pipe whose rheological conductance is small enough to provide the requisite overpressure within the tube to overcome the tendency for the tube to flatten during the shrinkage of its bore, and wherein the concentration of the halide or oxy-halide in relation to the oxygen is such as to compensate at least in part the volatile oxide loss by volatilization during bore shrinkage.

2. A method as claimed in claim 1 wherein said material that is to form the core of the preform contains two or more volatile oxides and wherein said gas mixture contains oxygen and a halide or oxyhalide of each of the elements having said volatile oxides.

3. A method as claimed in claim 1 wherein the core of the preform contains the volatile oxide germania.

4. A method as claimed in claim 3 wherein the gas mixture contains germanium tetrachloride.

5. A method as claimed in claim 1 wherein the core of the preform contains the volatile oxide phosphorus pentoxide.

6. A method as claimed in claim 5 wherein the gas mixture contains phosphorus oxychloride.

7. A method as claimed in claim 1 wherein during the traverse that finally collapses the bore of the tube the requisite overpressure is maintained within the residual uncollapsed portion thereof to overcome the tendency for the tube to flatten during collapse of its bore.

8. A method as claimed in claim 2 wherein the core of the preform contains the volatile oxide germania.

9. A method as claimed in claim 2 wherein the core of the preform contains the volatile oxide phosphorus pentoxide.

* * * * *